United States Patent Office 3,098,362
Patented July 23, 1963

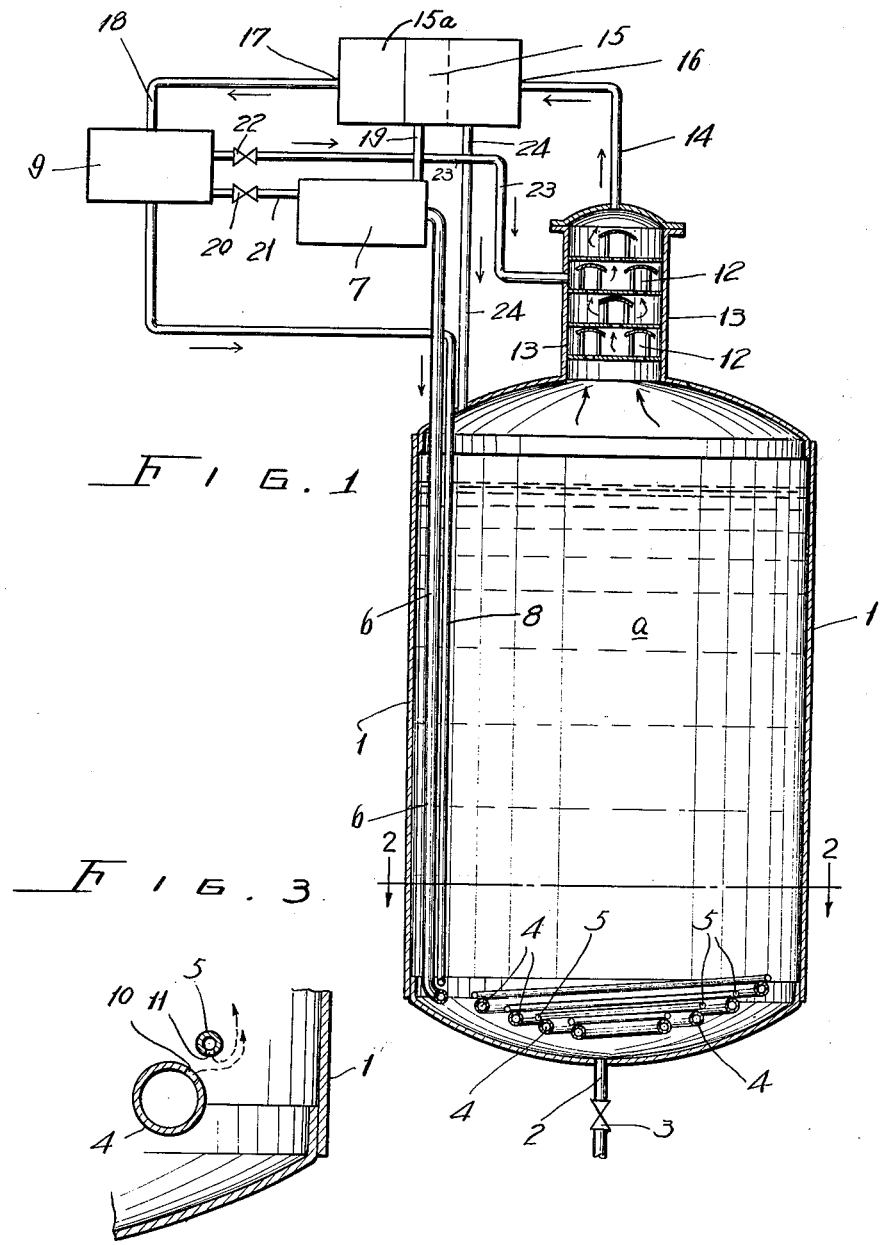

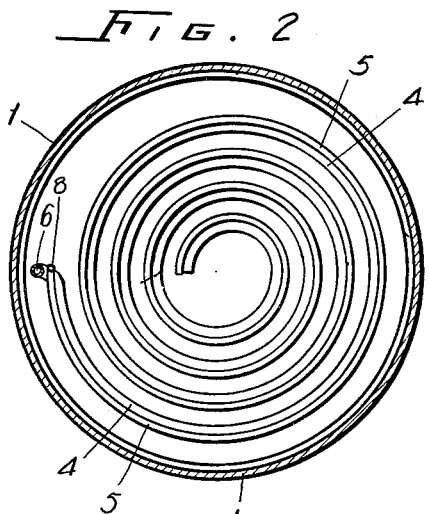
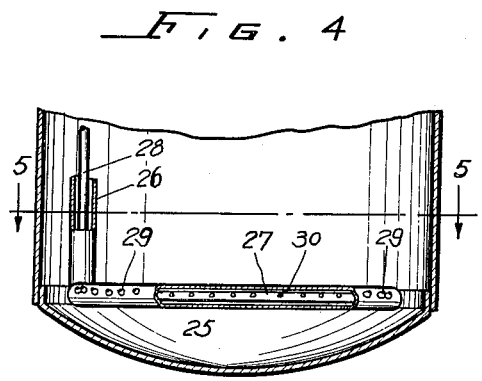
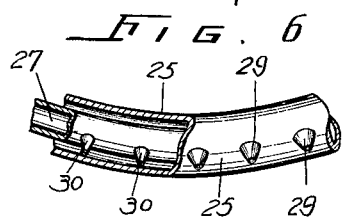
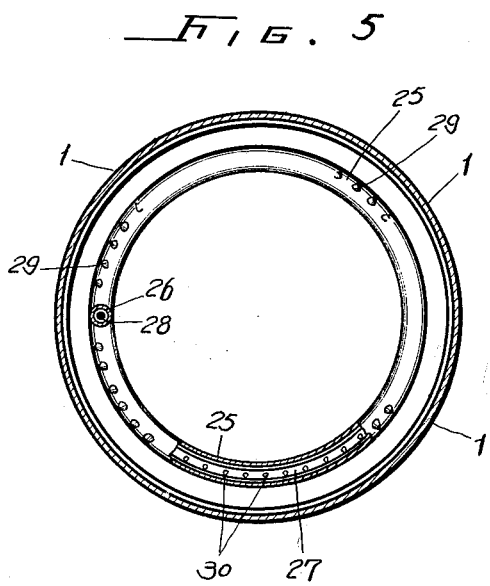
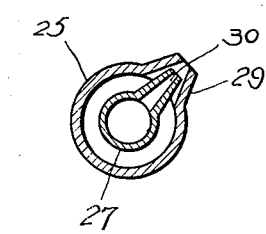

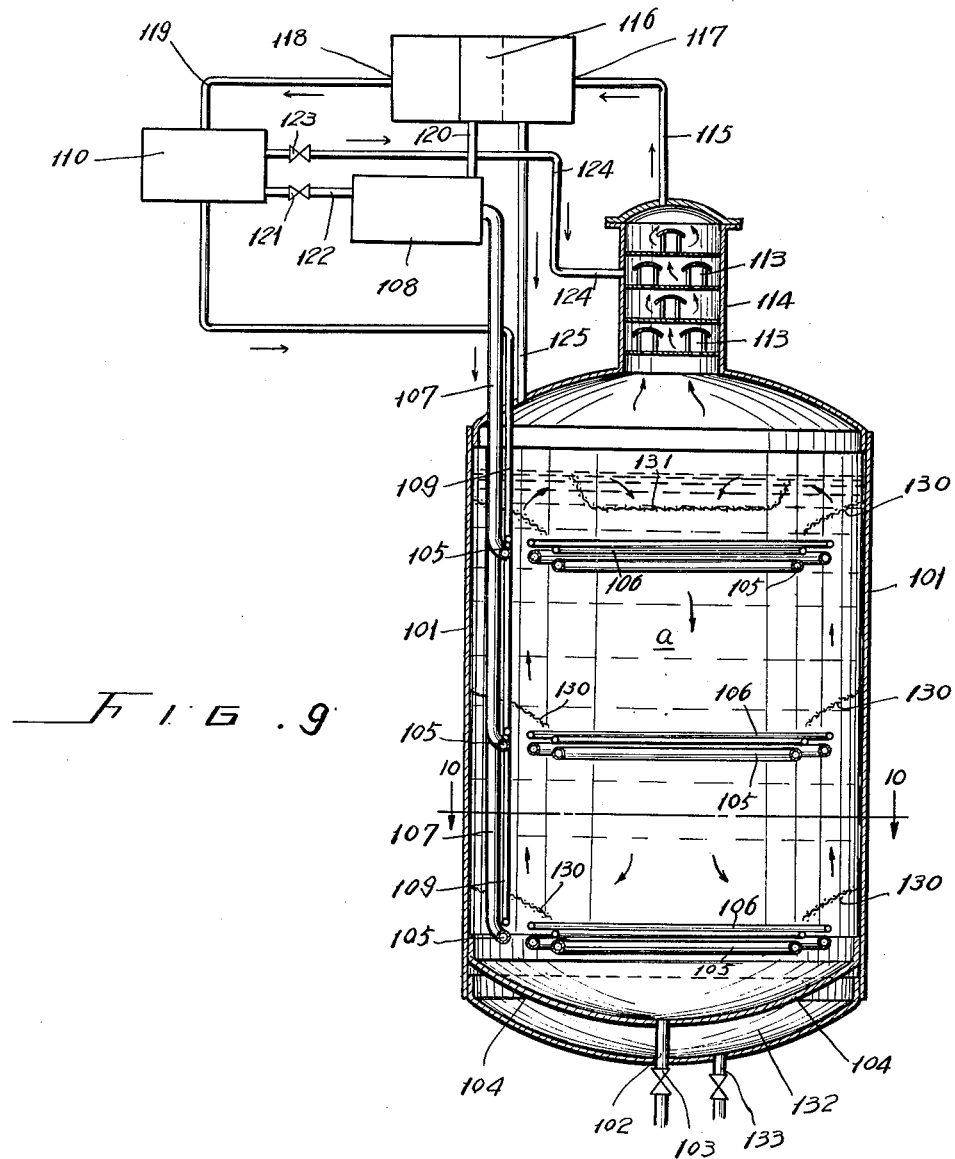

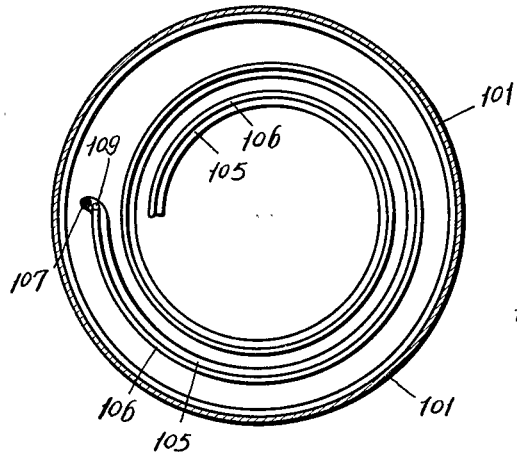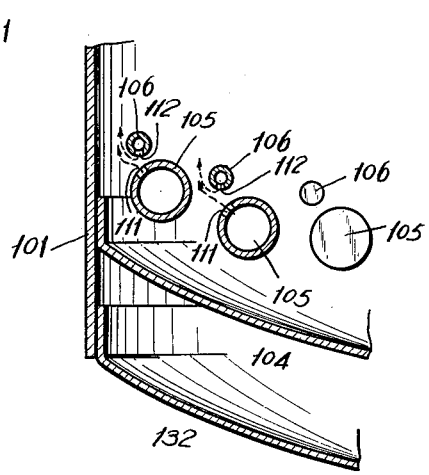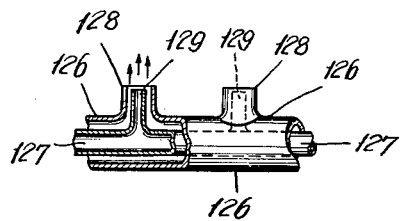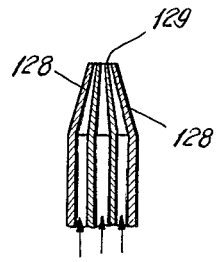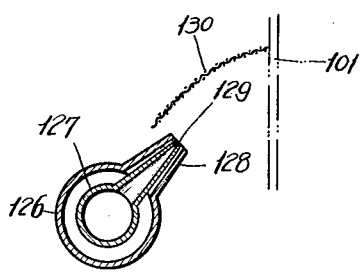

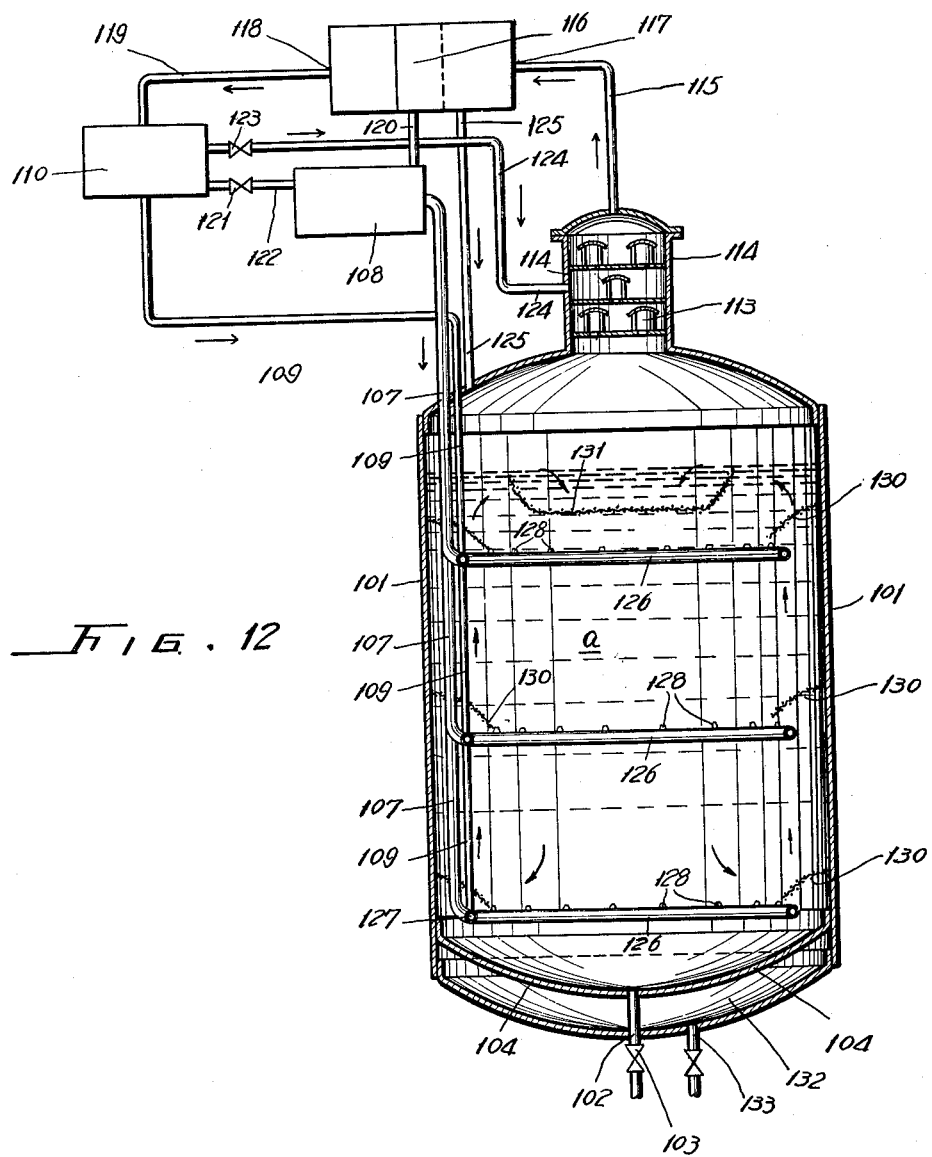

3,098,362
CONTAINER VESSEL FOR STORAGE AND TRANSPORTATION OF LIQUEFIED NATURAL GASES
Yoshitoshi Sohda and Yoshimi Sohda, Tokyo, Japan; said Yoshimi Sohda assignor to said Yoshitoshi Sohda
Filed Nov. 1, 1960, Ser. No. 67,964
Claims priority, application Japan Nov. 4, 1959
10 Claims. (Cl. 62—54)

The present invention relates to a container vessel assembly for the storage and transportation of liquefied natural and other similar gases. The liquefied gases referred to herein are those containing a substantial amount of liquefied methane or similar liquefied gases such as liquefied ethane, propane and the like, having a boiling point at normal pressure, ranging from −160 to −170° C.

Generally speaking, liquefied natural gases are stored in container vessels which are not specially constructed as pressure vessels, but are designed to have enough strength to be capable of withstanding atmospheric pressure so that it is easy to remove the evaporated gases therefrom, the outside surfaces of said vessels being covered with heat insulating materials in order to insulate the vessels to prevent the outside atmospheric heat from adversely affecting the cooled inner spaces of said vessels. The heat insulators thus provided are further covered with suitable mechanical protecting materials. These insulating and protecting materials do not, however, constitute any part of the present invention, so that suitably selected conventional means may be used for these purposes.

Liquefied natural gases contain generally more than 90% methane by volume. An example of the composition of such natural gases is: methane 99.2%; nitrogen 0.6%; and carbon dioxide 0.2%. Other combustible gases, such as ethane, propane, butane and the like are usually not present. It will be clear from the foregoing that liquefied natural gases contained in a container vessel are usually not explosive in themselves. It may be feared, however, that any natural gases which leak out of either the container vessel or the pipes and fittings connected thereto, may invite either fire explosions caused by an outside source of fire, or explosions induced by outside conditions, so that extreme care should be taken to prevent possible explosion of the stored liquefied natural gases. The range of explosive concentration of methane, for instance, in the air is 4.9–15.0% by volume. If gaseous methane mixes with air within said concentration range, the possibility of explosion will arise due to such causes as sparks, bare flames and the like, which, if it should happen, could result in considerable damages and losses.

When liquefied natural gases contained in one or more container vessels are stored or transported under normal or substantially normal pressure and kept at an extraordinarily low temperature, the contents will absorb a quantity of heat from the outside atmosphere and a small part of the stored liquid will thereby be evaporated into gases, even when the outside surfaces of the vessel have been most carefully covered with efficient insulating material. It has been a common practice, in order to handle this relatively small quantity of evaporated natural gases, mainly consisting of methane, to re-liquefy them by means of a compressor fitted to the vessel, and returning them to the interior thereof. By such compressing, re-liquefying and returning, loss of the evaporated natural gases can be substantially avoided. Since, according to the above mentioned conventional process, the evaporated gases are re-liquefied and re-circulated by a compressor, care should be taken to substantially completely obviate possible explosion of gases leaked from the compressor and associated equipment. For this purpose, a considerable amount of additional equipment is necessary, and considerable difficulties and troubles arise during the course of operation of the container plant.

It is therefore the main object of the invention to provide a novel and efficient container vessel of the kind above referred to, which substantially completely obviates the possible risk of fire or explosion.

Another object of the invention is to provide a container vessel of the kind above referred to, wherein the stored liquid is kept at a satisfactory low temperature by substantially preventing heat absorption by the vessel body, thus keeping the quantity of evaporating natural gases to a minimum.

Another object is to provide a container vessel of the kind above referred to, wherein a small quantity of evaporated natural gases which nevertheless unavoidably evaporates from the corresponding liquid phase contained therein is taken out therefrom, fractionated to liquid and returned back to said vessel in an easy and simple way.

Still another object of the invention is to provide a container vessel of the kind above referred to, which is highly efficient in use when stationary, or for use in the transportation of liquefied natural gases on board a ship or flying vessel, or either by rail or by road.

In the vessel according to the invention, for the realization of the above mentioned objects, means are provided to inject controlled quantities of both gaseous and liquefied nitrogen cooled to minus 170–180° C. into the interior of the container vessel, especially in the proximity of the cylindrical wall thereof and in finely divided form. In this manner, the injected nitrogen is brought into as intimate contact as possible with the liquid natural gases, especially in the proximity of the cylindrical wall of the vessel, for heat exchange purposes, thus providing effective cooling of the liquid to minimize evaporation thereof. The nitrogen passed through the body of said liquid and carrying a small quantity of evaporated natural gases is, when necessary, subjected to a fractionating treatment by passing the mixed nitrogen and natural gas through a fractionating chamber arranged on top of the vessel and fitted with a plurality of fractionating elements mounted in stages, therein for re-liquefying the evaporated natural gases, the thus re-liquefied natural gases returning to the interior of the vessel by gravity. There are further provided multi-stage compressor means for sucking-in the above mentioned gaseous nitrogen from said fractionating chamber, or direct from the top of said container vessel. The thus compressed gaseous nitrogen is cooled to the liquid phase and then re-circulated together with gaseous cooling nitrogen through the body of liquefied natural gases contained in the vessel as above referred to.

The above and further objects and novel features of the present invention will more fully appear from the following detailed description when the same is read in connection with accompanying drawings. It is to be expressly understood, however, that the drawings are for the purpose of illustration only and the invention is limited only by the claims.

In the drawings,

FIGURE 1 is a somewhat diagrammatic representation of a first embodiment of the invention with the container vessel proper and the cooling injection means arranged therein being illustrated in section;

FIGURE 2 is a horizontal section of the container vessel of FIG. 1 taken on line 2—2 of FIG. 1;

FIGURE 3 is an enlarged fragmental sectional view of the lower lefthand corner of the container vessel of FIGURE 1;

FIGURE 4 is a partial sectional of a somewhat modified form of a cooling injection system arranged in the proximity of the bottom wall of a container vessel, the container being shown in vertical section, while the cooling injection system is shown partly in section and partly in elevation;

FIGURE 5 is a horizontal section taken on line 5—5 of FIG. 4 and partly broken away;

FIGURE 6 is an enlarged partial front view of the cooling injection system shown in FIGURES 4—5, partly in section;

FIGURE 7 is a detail view of part of the cooling injection system as illustrated in FIGURES 4–6, showing the inter-relationship between the outer tubing and the inner tubing thereof;

FIGURE 8 is a cross-sectional view taken on the line 8—8 of FIGURE 7;

FIGURE 9 is a view similar to FIG. 1 of a second embodiment of the invention;

FIGURE 10 is a horizontal section taken on line 10—10 of FIG. 9;

FIGURE 11 shows an enlarged fragmental sectional view, illustrating the left bottom corner of the vessel of FIG. 9 and the cooling injection coils mounted therein;

FIGURE 12 is a view similar to that of FIG. 1 of a third embodiment of the invention;

FIGURE 13 is a detail view of part of the double-tube coil type cooling injection system employed in the third embodiment, partly in section and partly in plan view;

FIGURE 14 is an enlarged detail sectional view of a double-walled injection nozzle shown in FIGURE 13; and FIGURE 15 represents a fragmental sectional view, illustrating especially the inter-relationship of the double-tube injection coil, the cooling medium dividing net or screen and the shell wall of the container vessel.

Now, referring to the accompanying drawings, especially FIGURE 1 thereof, a container vessel 1, preferably made of suitable alloy steel, is substantially filled with liquefied natural gases as denoted by reference numeral *a*. The container vessel 1 has at the bottom thereof a dual purpose pipe 2 inlet and which serves as both an outlet, as the case may be, for the natural gases, said pipe being fitted with a valve 3. Within the vessel 1 and in the proximity of the bottom thereof, a gaseous nitrogen injecting coil 4 and a liquefied nitrogen injecting coil 5 are arranged so as to extend parallel to each other and in a spiral configuration, as illustrated especially in FIGURE 2. If desired, these coils 4 and 5 may be shaped in concentric rings. The coil 4 is connected to a supply pipe 6, which is in turn connected with a supply reservoir 7 for supplying gaseous nitrogen under pressure to said coil 4, said nitrogen being supplied at a suitable temperature ranging from −170 to −180° C. The coil 5 is connected to a separate supply pipe 8 which in turn is connected to a liquefied nitrogen reservoir 9 for supplying liquid nitrogen to said coil. It will be noted from the foregoing, that when both coils 4 and 5 have a plurality of concentric circular coil elements, both supply pipes 6 and 8 are provided with branch pipes corresponding in number to the number of said coil elements for supplying gaseous and liquefied nitrogen thereto in the desired manner for the purpose of injecting nitrogen in both states into the interior of container vessel 1 under pressure.

The gaseous nitrogen injection coil 4 is provided with a number of spaced orifices 10 along its length, and in a similar way the liquefied nitrogen injection coil 5 has therein a corresponding number of spaced injection orifices 11. In FIGURE 3 of the drawings, however, only two cooperating injection orifices 10 and 11 are shown. It will be seen that each of the first mentioned injection nozzles or orifices 10 are so formed and arranged that gaseous nitrogen is emitted therefrom in an upwardly oblique direction toward the inside surface of the wall of said vessel 1, while liquefied nitrogen is emitted from nozzles or orifices 11 in a downwardly oblique direction also toward the inside wall surface of the vessel, both coils 4 and 5 being arranged for this purpose substantially one above the another, yet spaced from each other a small distance. By the above mentioned arrangement of both the coils 4 and 5 and orifices 10 and 11, the liquefied nitrogen emitted from the first row of orifices 11 in the downwardly oblique direction flushes against the streams of gaseous nitrogen issuing from the second row of orifices 10 in the upwardly oblique direction so that both states of nitrogen are turned into their finely divided form and mixed intimately with each other. This finely dividing and mixing process will naturally accelerate the evaporation of the liquefied nitrogen, as well as the cooling of the nitrogen supplied in its gaseous state. The thus finely divided mixture in the bubble form swirls towards the inside wall surface of the vessel 1 and then rises towards the free surface of the liquefied natural gases contained in the vessel, while further cooling the stored liquid.

Both the injection coils 4 and 5 arranged in proximity to the bottom of vessel 1 may have the same diameter throughout the whole length of each coil. If necessary, however, each of said coils 4 and 5 can have a diameter which decreases as it approaches the center of the vessel. Alternatively, each of said coils can have a finer pitch as it approaches the vessel wall, and the pipe diameter remains unchanged. In the last mentioned instance, each of the coils is arranged so as to have a coarser pitch as it comes nearer to the center of the vessel. If desired, the nozzles or orifices 10 and 11 can have a larger cross sectional area the nearer they are to the vessel wall. All these measures supply larger quantities of gaseous and liquefied nitrogen in the region nearer to the vessel wall than to the more central portions of the container vessel. These measures take into consideration the fact that the contents of the vessel are affected thermally to a more appreciable degree in the proximity of the vessel wall, which is naturally highly influenced by the higher temperature prevailing outside the vessel, than are the contents in the more central region in the vessel. By the above mentioned various measures, the cooling medium is injected into the vessel at a maximum quantity per unit time period in the peripheral region in comparison with the remaining zones within the vessel.

As clearly seen from FIGURE 1 of the attached drawings, there is provided a fractionating or rectifying chamber 13 having a plurality of rectifier elements or dishes 12 arranged in vertical stages, on top of and at the central portion of the vessel, said chamber being shaped as a neck on the body of the vessel. The uppermost portion of the chamber 13 is connected by a connecting pipe 14 to the suction inlet 16 of a multi-stage refrigerant compressor 15 and cooler 15a connected directly thereto, while the delivery side 17 of the cooler 15a is connected by a delivery pipe 18 to the aforementioned liquid reservoir 9 in which liquefied nitrogen discharged from said cooler is collected. As already described, the liquefied nitrogen is supplied from the reservoir through supply pipe 8 into the interior of the vessel 1, the liquefied nitrogen being constantly recirculated therethrough. On the other hand, gaseous nitrogen is separately taken off from a suitable stage of the compressor and led through a pipe 19 to the aforementioned gaseous nitrogen reservoir 7. The nitrogen gas is supplied therefrom, as already described hereinbefore, through supply pipe 6 to the interior of the vessel 1 for re-circulation. When necessary, the pipe 19 may be provided with a cooler, an expansion valve and the like, although these are not shown.

Liquid reservoir 9 is connected with gas reservoir 7 by a connecting pipe 21 having valve means 20 therein, thus making it possible to supply the liquefied nitrogen at a proper rate from the former reservoir to the latter for always maintaining the gaseous nitrogen contained therein at proper temperatures ranging from −170° C. to −180° C. On the other hand, a further connecting pipe 23 having valve means 22 therein is between the liquid reservoir 9 and an intermediate stage in the fractionating chamber 13, or another such suitable point, for introducing liquefied nitrogen to any suitable one or more of the rectifier elements 12, in order to effectively fractionate the mixed gas passing from the vessel 1 into chamber 13.

The mixed gas in the fractionating chamber 13 comprises a substantial quantity of gaseous nitrogen mixed with a relatively small quantity of gaseous natural gases and is subjected therein to a fractionating action provided by the staged fractionating elements 12. Thus a substantial part of the natural gases contained in the mixed gases is liquefied and returned in its liquid state back to the vessel 1. In this case, as already mentioned, a relatively small quantity of liquefied nitrogen is introduced at a proper controlled rate into the chamber 13 through connecting pipe 23, so that the above mentioned re-liquefying process of the natural gases is effectively accelerated to a satisfactory degree.

The multi-stage compressor 15, only diagrammatically represented in FIGURE 1, sucks the thus fractionated gaseous nitrogen, still containing a slight amount of natural gases therein, the latter being thereby effectively re-liquefied. For the purpose of returning the natural gases liquefied in the compressor to the vessel, the latter is provided with a return pipe 24, which leads to the top part of the vessel 1.

It will be noted from the foregoing, that the vessel 1 fitted with injection coils 4 and 5 acts as a fractionator, so that, if necessary, the aforementioned fractionating chamber may be dispensed with and the compressor may suck the mixed nitrogen and natural gases through connecting pipe 14 directly from top of the vessel 1.

FIGURES 4-8 show a somewhat modified form of the injection system arranged in a vessel 1 for simultaneous injection of gaseous and liquefied nitrogen. This modified injection system comprises a double-walled circular coil arranged in a substantially horizontal plane in proximity to the bottom wall of vessel 1. This coil includes an outer ring coil 25 connected with an outer supply pipe 26 for gaseous nitrogen, and an inner ring coil 27 arranged concentrically within said outer coil 25. The inner coil 27 is connected to an inner supply pipe 28 concentrically arranged in said outer supply pipe 26 for liquefied nitrogen. As most clearly shown in FIGURES 4 and 8, the outer coil 25 is provided on its outer peripheral surface with a number of spaced injection nozzles 29 directing upwardly and outwardly in an inclined position for ejection of gaseous nitrogen towards the inner peripheral surface of the wall of vessel 1. Each of said injection nozzles is concentric with inner injection nozzle 30, the latter projecting from the corresponding portion of the inner coil 27 for ejection of liquid nitrogen. Due to the ejector-like arrangement of these outer nozzles 29 for ejecting gaseous nitrogen, the liquid ejected through the corresponding inner nozzles 30 is divided into particles and urged toward the wall of vessel 1 in an upwardly inclined manner. The thus ejected nitrogen in gaseous and liquid phases is sufficiently mixed with part of the natural gases in the vicinity of these jet streams, and rises up to the top of the stored liquid in finely divided bubbles, producing a number of small swirls within the interior of the vessel.

It is also desirable to bring the desired heat exchange to a satisfactory degree between the liquefied natural gases stored within the container vessel 1, and the cooling nitrogen both in the liquid state and in the gaseous state, by distributing said cooling nitrogen in as finely divided form as possible, thus establishing intimate contact between the cooling medium and the liquefied natural gases. For this purpose, if necessary, wire mesh nets and the like made of fine alloy steel wires and acting as bubble-dividing means can be arranged horizontally and directly above the coils as illustrated more fully hereinafter. The provision of these dividing means will contribute to a substantial degree to further dividing relatively larger bubbles of nitrogen into still further smaller bubbles, which, having larger total surface area, will rather gradually come up to the surface of the stored liquid, and thus provide more effective heat exchange with the liquid stored in the container vessel.

Next, referring to further drawings, especially FIGURE 9 thereof, a container vessel 101, which is preferably made of a suitable chemically resistant alloy steel, is filled with liquefied natural gases denoted by reference numeral a, as in the foregoing embodiment illustrated in FIGURE 1. The container vessel 101 has at the bottom thereof a dual purpose pipe 102 serving both as the inlet and the outlet, as the occasion may demand, for the natural gases, said pipe being for this purpose fitted with a valve 103 in the same manner as in the embodiment shown in FIGURE 1. The vessel 101 has a bottom wall 104 in a dish shape.

Within the interior of said vessel 101, are several cooling coil assemblies spaced one above the other in the vertical direction and arranged in parallel stages, each of said coil assemblies comprising a gaseous nitrogen coil 105 and a liquid nitrogen coil 106. Each pair of coils 105 and 106 can be arranged in concentric spirals as shown in FIGURE 10, if necessary, in a plurality of concentric circular coils. Each coil 105 is connected to a supply pipe 107, which leads to a supply reservoir 108, for controlled ejection of gaseous nitrogen having a specific temperature as specified hereinbefore. In a similar way, the coil 106 is connected to a separate supply pipe 109, which leads to a separate supply reservoir 110, for controlled ejection of liquid nitrogen. Although not shown, these supply pipes 107 and 109 are provided with suitable valve means for control of the gaseous and liquid media flowing therethrough at suitable flow rates. With each gaseous nitrogen pipe 105 connected to the supply pipe 107 and each liquid nitrogen pipe 106 connected to the supply pipe 109, it will be seen that the pairs of coils are in parallel.

Each of the gaseous nitrogen coils 105 has a number of spaced ejection orifices 111 in the peripheral surface thereof for injection of gaseous nitrogen into the stored liquid gas. Each of the liquid nitrogen coils 106 also has the same number of spaced ejection orifices 112 in the surface thereof extending in a direction substantially opposed to the direction in which the above mentioned gas orifices 111 extend acting to inject liquid nitrogen into the stored liquid gas. These orifices and their positions are clearly shown in FIGURE 11. These orifices 111 and 112 correspond in their arrangement as well as function to those denoted by 10 and 11, respectively, and illustrated hereinbefore in connection with FIGURES 1 and 3, so that it is believed no further detailed explanations are necessary.

The diameter of the pipes of either coil 105 or 106, and the pitch of these coils or coil elements, may be suitably selected to increase the cooling effect in the neighborhood of the cylindrical wall of the vessel 1 relative to the central portion thereof, as fully described hereinbefore in connection with coils 5 and 6 in the previous embodiment shown in FIGURES 1-3.

As clearly illustrated in FIGURE 9, this embodiment employs a fractionating or rectifying chamber 114 having a plurality of rectifier elements or dishes 113 arranged in vertical stages, at the top of and at the central portion of vessel 101. This chamber 114 and these elements 113 coincide in their arrangement as well as function to those denoted by reference numerals 13 and 12, respectively, shown in FIGURE 1, so that no further description thereof is necessary. It should, however, be mentioned at this point in the description, that a connecting pipe 115 connects the top of said fractionating chamber 114 with the suction side 117 of a multi-stage refrigerant compressor 116, again diagrammatically represented, while a cooler 118 on the delivery side of the compressor is connected by a delivery pipe 119 to a liquid reservoir 110 for accumulating nitrogen delivered from the compressor. As already described, the liquefied nitrogen is supplied from the reservoir through supply pipe 109 to the interior of the vessel 1, so that the liquefied nitrogen is constantly being recirculated therethrough. This arrangement and function are just the same as in the preceding embodiment.

As in the preceding embodiment, gaseous nitrogen is derived from a suitable stage of the compressor separately and through a conduit pipe 120 leading to the aforementioned gaseous nitrogen reservoir 108, and so on. Also, in the present embodiment, the conduit 120 may be provided, if necessary, with a cooler, an expansion valve and the like, although these elements are not shown.

The liquid reservoir 110 is connected with the gas reservoir 108 by a connecting pipe 122 having valve means 121 fitted therein. A further connecting pipe 124 having valve means 23, is provided, leading from liquid reservoir 110 to an intermediate stage in the fractionating chamber 114, or to another suitable point therein. These arrangements and the function thereof are also shown and described in connection with the first embodiment of the invention.

As in the first embodiment, the compressor 116 is provided with a return pipe 125, the function of which is just the same as that of piping 24. Instead of connecting the return piping 125 with the vessel 101, it can be, if necessary, connected to a separate container, although this arrangement is not shown.

FIGURES 12-15 show a somewhat modified embodiment from that shown in FIGURES 9-11, wherein each stage of cooling coil assembly is in the form of composite double-tube type circular coil similar to that shown in FIGURE 5, said composite coil comprising an outer ring coil 126 arranged in a horizontal plane and in the neighborhood of the cylindrical wall of the vessel 101, and connected to the gaseous nitrogen supply pipe 107, which is positioned in the same place in the container as in the preceding embodiment and is denoted by the same reference number. An inner ring coil 127 is mounted in the outer coil 126 and in a concentric relationship therewith. This construction is most clearly illustrated in FIGURE 13. The inner coil 127 is connected to the liquid nitrogen supply pipe 109 for receiving liquid therefrom. The liquid supply pipe positioned in the same place in the container as in the preceding embodiment, and is designated by the same reference number.

In the present embodiment, a plurality of gaseous nitrogen ejection nozzles 128 are formed at proper intervals on the outer coil 126, as shown in FIGURES 12-13. Each of these nozzles 128 is directed towards the cylindrical wall of vessel 101 and in an upwardly and outwardly inclined direction, as most clearly illustrated in FIGURE 15. In like manner, an equal number of liquid nitrogen ejection nozzles 129 are positioned on the inner coil 127, each of said nozzles 129 being concentric relative to the corresponding outer nozzle 128, as clearly seen from FIGURES 13-15. This construction and the function thereof are similar to those described hereinbefore in connection with FIGURES 7 and 8. It is believed, therefore, no further detailed description thereof is necessary.

As already briefly described hereinbefore, the gaseous and liquefied nitrogen injected into the stored liquid gas in the neighborhood of the cylindrical wall of the container vessel should be as finely divided as possible, in order to carry out the necessary heat exchange with the body of liquefied natural gas contained in the vessel. For this purpose, in the last mentioned two embodiments of the invention, a net 130 made of fine alloy steel wires is mounted on the inside surface of the wall of the vessel at a position above the coils 105 and 106 or 126—127 such that it will cover the coils yet will be separated from them. This net 130 extends in a downwardly and inwardly inclined direction, as most clearly illustrated in FIGURE 15, and intercepts the finely divided droplets and bubbles of nitrogen ejected from orifices 105 and 106, or nozzles 128 and 129 and further divides them as then pass through the net or screen.

A similar net or screen 131 is positioned in a horizontal plane slightly below the top of the liquid contained in the vessel 101, as diagrammatically shown by a dotted line in FIGURE 9 or 12, respectively. The net 131 is positioned to collect solidified flakes of natural gases which are formed when the stored liquid gas is overcooled by the cooling nitrogen. The collected flakes are then brought into contact with the downward streams of liquefied natural gases which develop in the central region of the vessel due to convection, thus producing a heat exchange with the liquid natural gases contained in the vessel 101.

The vessel 101 can have a double bottom in the form of a cooling jacket 132, which can be supplied with gaseous nitrogen through a supply pipe 133 connected therewith. As shown, the supply pipe is provided with valve means to control the rate at which the gaseous nitrogen is introduced. This double bottom arrangement serves to insulate the bottom wall 104 of the vessel 101. When the double bottom 32 is charged with gaseous nitrogen having a higher pressure than that of the stored liquid, the bottom wall plate can have a plurality of fine openings therein, preferably along the peripheral edge of the plate, so as to cause injection of the gaseous nitrogen from the space within the double bottom 32 into the interior of said vessel 101 in the form of fine bubbles to produce additional cooling.

It will be clear to those skilled in the art that the container vessel and such pipes as the pipes conducting gaseous and liquid nitrogen should be insulated with heat insulating material, such as cork, glass or mineral wool or the like, for insulating the container vessel and the like from the heat of the outside atmosphere. Such insulation has not, however, been shown and described in order to keep the drawings as well as the description simple.

As already described hereinbefore, a substantial part of the liquefied natural gases is methane, say 90–99% thereof by volume. As commonly known, liquid methane boils at −161.5° C. under normal pressure, and solid methane melts at −182.7° C. under atmospheric pressure. It will be clear from the foregoing, that if the cooling nitrogen is kept at a temperature substantially lower than minus 170–180° C., part of methane will be inclined to solidify, which must naturally be avoided. For this reason, the cooling nitrogen must preferably by kept between −170 and −180° C.

On the other hand, the liquid nitrogen which is injected into the body of liquid natural gases in finely divided form is brought into contact with a large quantity of liquid methane having a relatively higher temperature, normally ranging between about −162 and −165° C., so that a substantial part of the liquid nitrogen is caused to evaporate, to a lesser or a larger degree according to the quantity injected, thus forming finely divided gaseous bubbles of nitrogen. It may, however, be observed that part of liquid methane is solidified because it is over-cooled by the liquid nitrogen. The thus solidified methane in the form of fine flakes are further brought into contact with large amounts of the neighboring liquid methane and thus are turned back into liquid methane. Even when a small quantity of solidified methane rises to the surface of the liquid in the vessel, it is carried back into the body of liquid by downward streams of liquefied methane existing at the central portion of the liquid body, and they are thus brought into contact with liquid methane, so that the fine solids return to their liquid state. In the arrangement according to the invention, gaseous and liquid nitrogen are simultaneously injected into the interior of the container vessel, so that a relatively smaller quantity of liquid nitrogen provides the same cooling effect upon the liquid natural gases contained therein than would be the case if only a relatively large amount of gaseous cooling nitrogen were introduced.

The above mentioned advantage of effective cooling provided by the present invention will now be illustrated by way of example.

The rate at which it is necessary to supply gaseous nitrogen for complete prevention of the evaporation of liquefied methane, 1000 kgs., is theoretically 5.4 kgs./hr. by weight, or 4.32 cub. meters/hr. by volume. When these values are converted to a per minute or per second base:

90 grs./min. or 1.5 grs./sec. (by weight)
72 lit./min. or 1.2 lit./sec. (by volume)

On the contrary, using only liquefied nitrogen for the same purpose, the corresponding rate will amount to 251 grs./hr. or 311 cub. centimeters/hr., respectively. When these figures are converted to a per minute or per second base:

4.19 grs./min. or 0.070 grs./sec.
5.20 cc./min. or 0.087 cc./sec.

Now assuming, that the liquid nitrogen introduced has been completely evaporated, the volumetric feed rate will amount to:

201 lit./hr., 3.35 lit./min. or 56 cc./sec.

Further, on the other hand, the quantity of gaseous nitrogen necessary to successfully prevent 1000 lit. of liquefied methane from evaporating, will amount to 2.28 kgs./hr. or 1.83 cub. meters/hr. If these figures converted to a per minute and per second base, they are:

38.0 grs./min. or 0.635 grs./sec. (by weight)
30.5 lit./min. or 0.51 lit./sec. (by volume)

When liquefield nitrogen only is used for the same purpose in place of gaseous nitrogen, the corresponding figures will be 106 grs./hr. or 132 cc./hr. If these values are converted to a per minute or per second base, they are:

1.77 grs./min. or 0.029 grs./sec. or
2.20 cc./min. or 0.037 cc./sec.

If it is assumed that all the introduced liquefield nitrogen has been evaporated, the volumetric quantity will be:

85 lt./hr. or 1.42 lit./min. or
23 cc./sec.

From the above, it will be clear that with use of liquified nitrogen for the cooling purposes, the quantity thereof which must be supplied can be appreciably smaller than gaseous nitrogen, when the latter is injected in place of the former. By this procedure, means for injection of cooling nitrogen into the container vessel 1 may be appreciably simplified and the troubles and labor costs which arise in the operation of the introduction means can be correspondingly reduced.

The numerical basis for the above calculations, that is, the quantity of liquefied methane which evaporates are given in detail hereinbelow:

As commonly known, 1 ton of liquefied methane corresponds to 2.36 kilolitres. When this quantity of liquefied methane has been completely gasified, the quantity will increase to 1400 cub. meters.

Now, assuming that 0.25% of 1,000 kgs. of liquefied methane is evaporated per day, then $$1{,}000 \text{ kgs.} \times 0.0025 = 2.5 \text{ kgs./day}$$
$$= 0.104 \text{ kgs./hr.}$$

Since the latent heat of evaporation of liquefied methane is 121.9 kcal./kg., the following quantity of heat must be supplied for the evaporation of said quantity of liquefied methane:

$$121.9 \text{ kcal.} \times 0.104 = 12.6 \text{ kcal./hr.}$$

The specific heat of gaseous nitrogen, at a temperature of −160° C., is 0.13 kcal./kg., while the latent heat of evaporation of nitrogen is 45.8 kcal./kg. and the density of gaseous nitrogen amounts to 1.25 grs./lit.

Then, the necessary quantity of gaseous nitrogen, when solely used for the desired cooling, will be:

$$0.13 \times (180 = 162) = 0.13 \times 18 = 2.33 \text{ kcal./kg.}$$
$$12.6 \div 2.33 = 5.4 \text{ kgs./hr.}$$

When only liquefied nitrogen is used for the same purpose, the corresponding necessary quantity will be, in a similar manner:

$$0.13 \times (195.8 = 162) = 4.4 \text{ kcal./kg.}$$
$$\frac{12.6}{45.8 + 4.4} = 0.251 \text{ kgs./hr.}$$

where 45.8 is the latent heat of evaporation of liquefied nitrogen in terms of kcal./kg., and the specific gravity thereof being taken as 0.808.

When the cooling media in the form of gaseous and liquid nitrogen is introduced into the body of liquefied natural gases stored in the container vessel, as in the present invention, the following main advantages are realized:

(1) Since the boiling point of liquid nitrogen, −195.8° C., lies substantially below that of liquefied methane, −151.5° C., greater cooling effect can be obtained with liquid nitrogen.

(2) Nitrogen is inert to liquefied methane and other natural gases, so that it has no appreciable affinity therefor.

(3) Nitrogen is a non-flammable medium.

(4) Nitrogen itself is not an explosive gas.

(5) Nitrogen in no way adversely affects the material of which the container vessel is made.

By using the container vessel according to the invention, the stored liquefied natural gases can effectively be kept in such conditions that they are substantially completely enclosed by nitrogen having a substantially lower temperature than the boiling point of the natural gases, −161.5°, so that effective cooling can be achieved and evaporation of liquefied natural gases can be kept to a minimum. When leakage of stored natural gases does take place due to causes such as cracks developed in the container wall, an extraordinary increase in the container pressure, or the like, the initial component of the leaked fluid will consist to a large extent of nitrogen. In this way, maximum safety against fire explosion can be thereby assured.

Although certain particular embodiments of the invention are herein disclosed for purposes of explanation, various further modifications thereof will be apparent to those skilled in the art to which the invention pertains after study of this specification. Reference should accordingly be had to the appended claims in determining the scope of the invention.

What is claimed is:

1. Container vessel assembly for storage and transportation of liquefied natural gases, said assembly comprising in combination: a vessel adapted for reception therein of a body of liquefied natural gases; a plurality of combined cooling injection coil assemblies having gaseous nitrogen coolant injection coil means and liquefied nitrogen coolant injection coil means; said combined cooling injection coil assemblies being positioned in said vessel and at a level below the level of said body of liquefied natural gases; multi-stage compressor means connected with top of said vessel; a gaseous nitrogen coolant reservoir connected with a stage of said compressor; a liquefied nitrogen coolant reservoir connected with the delivery side of said compressor; first piping means connecting said gas reservoir with said gaseous nitrogen injection coil means; and second piping means connecting said liquid reservoir with said liquefied nitrogen injection coil means.

2. Container vessel assembly for storage and transportation of liquefied natural gases, said assembly comprising in combination: a vessel adapted for reception therein of a body of liquefied natural gases; a plurality of combined cooling injection coil assemblies at a position below the level of said body having gaseous nitrogen coolant injection coil means and liquefied nitrogen coolant injection coil means; a fractionating chamber mounted on top of said vessel and communicating with the interior of said vessel; a plurality of fractionators arranged in stages within said chamber; multi-stage compressor means connected with said chamber; a gaseous nitrogen coolant reservoir connected with a stage of said compressor; a liquefied nitrogen coolant reservoir connected with the delivery side of said compressor; first piping means connecting said gas reservoir with said gaseous nitrogen injection coil means; and second piping means connecting said liquid reservoir with said liquefied nitrogen injection coil means.

3. Container vessel assembly for storage and transportation of liquefied natural gases, said assembly comprising in combination: a vessel adapted for reception therein of a body of liquefied natural gases; a plurality of combined cooling injection coil assemblies at a position below the level of said body having gaseous nitrogen injection coil means and liquefied nitrogen coolant injection coil means; a fractionating chamber mounted on top of said vessel and communicating with the interior of said vessel; a plurality of fractionators arranged in stages within said chamber; multi-stage compressor means connected with said chamber; a gaseous nitrogen coolant reservoir connected with a stage of said compressor; a liquefied nitrogen coolant reservoir connected with the delivery side of said compressor; a first piping means connecting said gas reservoir with said gaseous nitrogen injection coil means for supplying pre-cooled gaseous nitrogen having a temperature between −170° C. and −180° C.; and second piping means connecting said liquid reservoir with said liquefied nitrogen injection coil means, each of said coil means being provided a number of injection nozzles formed along the periphery of the corresponding coil means in a spaced manner and adapted to direct the respective nitrogen coolant substantially towards the peripheral wall of said vessel.

4. Container vessel assembly as claimed in claim 3, wherein said both kinds of injection coil means are formed in spiral coils, each of which is arranged in a horizontal plane.

5. Container vessel assembly as claimed in claim 3, wherein said both kinds of injection coil means are formed in concentric circular coil elements.

6. Container vessel assembly as claimed in claim 3, wherein each of injection nozzles on said gaseous nitrogen injection coil means directs in the upward and outward direction and each of injection nozzles on said liquefied nitrogen injection coil means directs in the downward and outward direction, so as to make both gaseous and liquefied nitrogen streams issuing from said nozzles in collision against each other.

7. Container vessel assembly for storage and transportation of liquefied natural gases, said assembly comprising in combination: a vessel adapted for reception therein of a body of liquefied natural gases; a plurality of combined cooling injection coil assemblies of double-tube construction, the outer tubing thereof serving as gaseous nitrogen injection coil means and the inner tubing thereof being used as liquefied nitrogen injection coil means; a number of nozzle means formed on said outer tubing and directing the gaseous jets upwardly and outwardly towards the peripheral wall of said vessel; the same number of nozzle means formed on said inner tubing and arranged in concentric relationship with said outer nozzle means; all said nozzle means being positioned at below the level of said body of liquefied natural gases; divider screen arranged above said coil means; a fractionating chamber mounted on top of said vessel and communicating with the interior of said vessel; a plurality of fractionators arranged in stages within said chamber; multi-stage compressor means connected with said chamber; a gaseous nitrogen coolant reservoir connected with a stage of said compressor; a liquefied nitrogen coolant reservoir connected with the delivery side of said compressor; a first piping means connecting said gas reservoir with said gaseous nitrogen injection coil means for supplying pre-cooled gaseous nitrogen having a temperature between −170° and −180° C.; and second piping means connecting said liquid reservoir with said liquefied nitrogen injection coil means.

8. A device for the storage and transportation of liquefied natural gases, said device comprising in combination: a vessel adapted for reception therein of a body of liquefied natural gases; a combined cooling injection coil assembly having, in juxtaposed relation to each other, gaseous nitrogen injection coil means and liquefied nitrogen coolant injection coil means; said several coil means being positioned in said vessel and at a level below the level of said body of liquefied natural gases; multi-stage compressor means connected with top of said vessel; a gaseous nitrogen coolant reservoir connected with a stage of said compressor; a liquefied nitrogen coolant reservoir connected with the delivery side of said compressor; first piping means connecting said gas reservoir with said gaseous nitrogen injection coil means; and second piping means connecting said liquid reservoir with said liquefied nitrogen injection coil means.

9. A device for the storage and transportation of liquefied natural gases, said device comprising in combination: a vessel adapted for reception therein of a body of liquefied natural gases; a combined cooling injection coil assembly having, in juxtaposed relation to each other, gaseous nitrogen injection coil means and liquefied nitrogen coolant injection coil means; said several coil means being positioned in said vessel and at a level below the level of said body of liquefied natural gases; multi-stage compressor means connected with top of said vessel; a gaseous nitrogen coolant reservoir connected with a stage of said compressor; a liquefied nitrogen coolant reservoir connected with the delivery side of said compressor; first piping means connecting said gas reservoir with said gaseous nitrogen injection coil means; and second piping means connecting said liquid reservoir with said liquefied nitrogen injection coil means; each said injection coil means comprising a portion disposed in close relationship to the wall of said vessel and having a configuration corresponding essentially to the contour of a portion of said wall.

10. The method of cooling liquefied methane in the storage and transportation thereof in a tank having walls exposed to ambient thermal influences, which comprises injecting liquefied nitrogen into said tank below the surface of the liquefied methane at a plurality of points in close juxtaposition to the interior of said wall and along substantially the entire extent of the latter, said injected liquefied nitrogen being at a temperature below that of the liquefied methane, concomitantly injecting gaseous nitrogen into said tank below the surface of the liquefied methane at points corresponding to the aforedefined points of injection of liquefied nitrogen, the directions of flow at the said several points of injection being such that the injected liquid nitrogen flushes against the injected gaseous nitrogen with resultant atomization and intimate admixture of the injected nitrogen, adjusting the direction and magnitude of the flow of the injected gaseous nitrogen so that the injected nitrogen admixture is directed at least in part essentially along the interior of the tank wall, and recovering and reinjecting the nitrogen after its passage through the liquefied methane.

References Cited in the file of this patent

UNITED STATES PATENTS

| | | |
|---|---|---|
| 2,611,511 | Wissmiller | Sept. 23, 1952 |
| 2,783,624 | Morrison | Mar. 5, 1957 |
| 2,959,928 | Maker | Nov. 15, 1960 |
| 2,964,916 | Keeping | Dec. 20, 1960 |